US010480846B2

(12) United States Patent
Fujimoto et al.

(10) Patent No.: US 10,480,846 B2
(45) Date of Patent: Nov. 19, 2019

(54) REFRIGERATION APPARATUS FOR CONTAINER

(71) Applicant: DAIKIN INDUSTRIES, LTD., Osaka-shi, Osaka (JP)

(72) Inventors: Yuusuke Fujimoto, Osaka (JP); Naoki Nakatani, Osaka (JP); Hisaaki Takaoka, Osaka (JP); Norio Iga, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 16 days.

(21) Appl. No.: 15/526,449

(22) PCT Filed: Nov. 27, 2015

(86) PCT No.: PCT/JP2015/005930
§ 371 (c)(1),
(2) Date: May 12, 2017

(87) PCT Pub. No.: WO2016/084393
PCT Pub. Date: Jun. 2, 2016

(65) Prior Publication Data
US 2017/0328625 A1    Nov. 16, 2017

(30) Foreign Application Priority Data

Nov. 28, 2014 (JP) .................. 2014-242143

(51) Int. Cl.
*F25D 17/04*      (2006.01)
*F25D 11/00*      (2006.01)
(Continued)

(52) U.S. Cl.
CPC ............ *F25D 17/042* (2013.01); *F24F 11/38* (2018.01); *F24F 11/52* (2018.01); *F25B 49/005* (2013.01); *F25D 11/00* (2013.01); *F25D 11/003* (2013.01); *A23B 7/055* (2013.01); *A23V 2002/00* (2013.01); *F25B 2500/06* (2013.01)

(58) Field of Classification Search
CPC ...... F25D 17/042; F25D 11/00; F25B 49/005; F25B 2500/06; F24F 11/38; A23B 7/055
See application file for complete search history.

(56) References Cited

U.S. PATENT DOCUMENTS

2013/0174586 A1* 7/2013 Kang .................... F25D 29/00
                                                                 62/56
2014/0238060 A1* 8/2014 Tamaki .................. F25B 49/00
                                                                 62/127

FOREIGN PATENT DOCUMENTS

CN      101110053 A      1/2008
DE      4202204 A1       7/1993
(Continued)

OTHER PUBLICATIONS

International Search Report (PCT/ISA/210) for PCT/JP2015/005930 dated Feb. 16, 2016.

*Primary Examiner* — Emmanuel E Duke
(74) *Attorney, Agent, or Firm* — Birch, Stewart, Kolasch & Birch, LLP (57) ABSTRACT

A failure determiner is provided to perform a failure diagnosis to successively evaluate functions of the refrigerant circuit and components forming the refrigerant circuit for a plurality of evaluation items. If the failure diagnosis is interrupted, the failure determiner has a restarting function to restart the failure diagnosis from an intermediate point of the failure diagnosis.

20 Claims, 6 Drawing Sheets

(51) Int. Cl.
*F25B 49/00* (2006.01)
*F24F 11/38* (2018.01)
*F24F 11/52* (2018.01)
*A23B 7/055* (2006.01)

(56) References Cited

FOREIGN PATENT DOCUMENTS

| | | | |
|---|---:|---|---:|
| JP | 3-94339 | A | 4/1991 |
| JP | 0394339 | A * | 4/1991 |
| JP | 05191496 | * | 7/1993 |
| JP | 7-295817 | A | 11/1995 |
| JP | 5-191498 | A | 1/2008 |
| JP | 2013-140002 | A | 7/2013 |
| JP | 2014227057 | A * | 12/2014 |
| JP | 2014227057 | A * | 12/2014 |

* cited by examiner

```
Sensor Data Collection              1/2
1st      <Full PTI>                  P02

Supply air temp                   10.0℃
Return air temp                   10.0℃
High Pressure                    300kPa
Low Pressure                     300kPa
Electronic EV            100%Open(420pls)
Compressor Speed                  0(0rps)
Discharge gas temp1              10.0℃
```

FIG. 3

```
              PTI Restart
                  10

Container ID     XXXXXXXX
       Controller Data  01/01/2015
       Controller Time        17:00
```

REFRIGERATION APPARATUS FOR CONTAINER

TECHNICAL FIELD

The present invention relates to a container refrigeration apparatus that cools the interior of a container.

BACKGROUND ART

Some of containers for use to transport freight by ship, for example, include a refrigeration apparatus (container refrigeration apparatus) with a refrigerant circuit (see, for example, Patent Document 1). While such a container stays at a port or somewhere else, a failure in a container refrigeration apparatus is often diagnosed with the refrigeration apparatus driven by power from a commercial power supply to ensure the functionality of the refrigeration apparatus.

CITATION LIST

Patent Document

PATENT DOCUMENT 1: Japanese Unexamined Patent Publication No. 2013-140002

SUMMARY OF THE INVENTION

Technical Problem

Unfortunately, the commercial power supply has low reliability depending on where the container stays. Thus, a failure diagnosis may be interrupted due to a power failure. A voltage drop or any other factor arising from a malfunction in a power supply system (a facility to supply power from the commercial power supply) may also cause a failure diagnosis to be interrupted. If a failure diagnosis is interrupted for the reasons described above, the failure diagnosis needs to be performed again. This may affect freight transport schedules.

In view of the foregoing background, it is therefore an object of the present invention to reduce the time loss caused by interrupting a failure diagnosis.

Solution to the Problem

To solve the problem, a first aspect of the invention provides a container refrigeration apparatus including a refrigerant circuit (20). The apparatus includes: a failure determiner (200) configured to perform a failure diagnosis to successively evaluate functions of the refrigerant circuit (20) and components forming the refrigerant circuit (20) for a plurality of evaluation items. If the failure diagnosis is interrupted, the failure determiner (200) has a restarting function to restart the failure diagnosis from an intermediate point of the failure diagnosis.

In this configuration, the failure determiner (200) has a mode for restarting an evaluation from an intermediate point of the failure diagnosis.

A second aspect of the invention is an embodiment of the first aspect of the invention. In the second aspect, the failure determiner (200) may have a mode for restarting the interrupted failure diagnosis from a beginning of an evaluation of one of the evaluation items an evaluation of which is interrupted.

In this configuration, the failure determiner (200) has a mode for restarting an evaluation on an evaluation-item-by-evaluation-item basis.

A third aspect of the invention is an embodiment of the first or second aspect of the invention. In the third aspect, the failure determiner (200) may further have a mode for restarting the interrupted failure diagnosis from an intermediate point of an evaluation of one of the evaluation items an evaluation of which is interrupted.

In this configuration, the failure determiner (200) has a mode for restarting the evaluation from the intermediate point of the evaluation of the evaluation item.

A fourth aspect of the invention is an embodiment of any one of the first through third aspects of the invention. In the fourth aspect, the evaluation items may include a first type of evaluation items to evaluate the components forming the refrigerant circuit (20), and a second type of evaluation items to evaluate a function of a combination of predetermined ones of the components, the second type of evaluation items being evaluated after the first type of evaluation items have been evaluated. If an evaluation of the first type of evaluation items is interrupted, the failure determiner (200) may restart the failure diagnosis from the evaluation of the first type of evaluation items.

In this configuration, each component alone is evaluated before an evaluation of the function of a combination of the predetermined components.

A fifth aspect of the invention is an embodiment of any one of the first through fourth aspects of the invention. In the fifth aspect, the container refrigeration apparatus may further include: a recorder (220) configured to record progress of the failure diagnosis. If the failure determiner (200) checks data recorded by the recorder (220) after being started, and finds an evaluation item that has not been evaluated yet, the failure determiner (200) may execute the restarting function.

In this configuration, the failure diagnosis may be automatically restarted.

A sixth aspect of the invention is an embodiment of any one of the first through fifth aspects of the invention. In the sixth aspect, the container refrigeration apparatus may further include: a transmitter (240) configured to notify a user, via telecommunication, of interruption of the failure diagnosis if the failure diagnosis is interrupted; and a receiver (230) configured to receive an instruction to restart the failure diagnosis via telecommunication. If the receiver (230) has received the instruction to restart the failure diagnosis, the failure determiner (200) may execute the restarting function.

In this configuration, in a situation where the failure diagnosis is interrupted, the transmitter (240) notifies the user of this situation. The failure diagnosis may be restarted by remote control.

A seventh aspect of the invention is an embodiment of any one of the first through sixth aspects of the invention. In the seventh aspect, the container refrigeration apparatus may have a function to select whether or not the restarting function is available in accordance with a user's instruction entered.

An eighth aspect of the invention is an embodiment of any one of the first through seventh aspects of the invention. In the eighth aspect, the container refrigeration apparatus may have a function to forcibly terminate an operation related to a restart in accordance with a user's instruction entered.

A ninth aspect of the invention is an embodiment of any one of the first through eighth aspects. In the ninth aspect, if a predetermined period of time has elapsed since a power supply of the container refrigeration apparatus turned off to interrupt the failure diagnosis, the failure determiner (200) may forcibly terminate an operation related to a restart.

A tenth aspect of the invention is an embodiment of any one of the first through ninth aspects of the invention. In the tenth aspect, the container refrigeration apparatus may further include: a display (250) configured to display what number failure diagnosis is being performed after receipt of a user's instruction to start a diagnosis.

An eleventh aspect of the invention is an embodiment of the first through tenth aspect of the invention. In the eleventh aspect, the container refrigeration apparatus may further include: a display (250) configured to display whether a failure diagnosis to be performed is a diagnosis performed for a first time after an instruction to start a diagnosis or a diagnosis to be restarted.

Advantages of the Invention

According to the first and second aspects, restarting a failure diagnosis from its intermediate point may reduce the time loss caused by interrupting the failure diagnosis.

According to the third aspect, the time loss may be more effectively reduced.

According to the fourth aspect, a failure diagnosis may be performed with higher reliability.

According to the fifth aspect, the interrupted failure diagnosis is automatically restarted. This may more effectively reduce the time loss.

According to the sixth aspect, a user may easily know a situation where a failure diagnosis has been interrupted.

According to the seventh through eleventh aspects, the user's convenience may be improved.

DESCRIPTION OF EMBODIMENTS

Embodiments of the present invention will now be described with reference to the drawings. Note that the following description of embodiments is merely illustrative in nature, and is not intended to limit the scope, application, or uses of the present invention.

First Embodiment of the Invention

A container refrigeration apparatus (10) according to a first embodiment of the present invention is used to cool the interior of an unshown container, and includes a refrigerant circuit (20), a controller (100), a failure determiner (200), and a display (250).

<Refrigerant Circuit>

Figure 1:
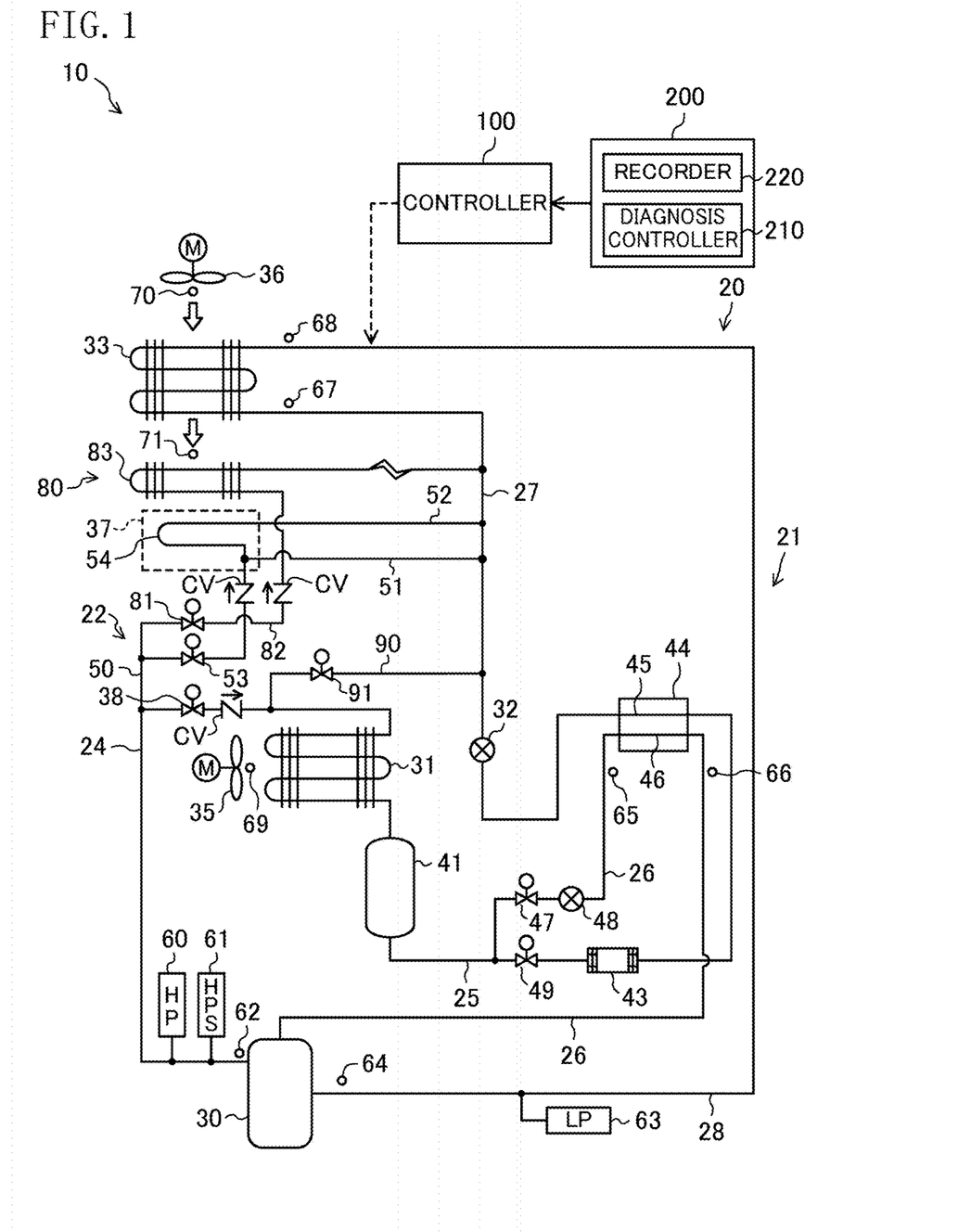
FIG. 1 is a piping system diagram of a refrigerant circuit of a container refrigeration apparatus.

FIG. 1 is a piping system diagram of the refrigerant circuit (20) of the container refrigeration apparatus (10). The refrigerant circuit (20) includes a main circuit (21), a hot gas bypass circuit (22), and a reheat circuit (80).

—Main Circuit (21)—

The main circuit (21) includes a compressor (30), a condenser (31), a main expansion valve (32), and an evaporator (33), which are connected together in series in this order through refrigerant pipes. The main circuit (21) further includes a subcooling heat exchanger (44).

Examples of the compressor (30) include a rotary compressor and a scroll compressor. The compressor (30) has a compression mechanism driven by a motor. Neither the compression mechanism nor the motor is shown. Power is supplied to the motor by an inverter circuit (not shown). Controlling the output of the inverter circuit allows the rotational speed of the motor to vary.

In this example, the condenser (31) and the evaporator (33) are both fin-and-tube heat exchangers. The condenser (31) is arranged outside the container. Outside air and a refrigerant exchange heat in the condenser (31). The evaporator (33) is arranged inside the container. Inside air and a refrigerant exchange heat in the evaporator (33). A drain pan (37) is provided below the evaporator (33). The drain pan (37) is configured as a flat receptacle having an opening facing upward. The drain pan (37) collects, for example, frost and ice blocks falling from the evaporator (33), and water condensed from the air.

The degree of opening of the main expansion valve (32) may be adjusted in multiple stages by a pulse motor. The main expansion valve (32) is connected to the evaporator (33) through a low pressure liquid pipe (27).

An outside fan (35) is provided near the condenser (31). An inside fan (36) is provided near the evaporator (33). The inside fan (36) supplies air cooled by the evaporator (33) into the container.

A high pressure gas pipe (24) is provided between the compressor (30) and the condenser (31), and includes a fourth open/close valve (38) and a check valve (CV), which are arranged in this order. The degree of opening of the fourth open/close valve (38) may be adjusted in multiple stages by a pulse motor. The check valve (CV) allows the refrigerant to flow in the direction of the arrow indicated in FIG. 1, and prohibits the refrigerant from flowing in the opposite direction.

A high pressure liquid pipe (25) is provided between the condenser (31) and the main expansion valve (32), and includes a receiver (41), a second open/close valve (49), a dryer (43), and the subcooling heat exchanger (44), which are arranged in this order. The receiver (41) is provided downstream of the condenser (31) to receive the refrigerant flowing through the condenser (31) and separate the received refrigerant into saturated liquid and saturated gas. The second open/close valve (49) is a solenoid valve which is freely opened and closed. The dryer (43) captures moisture in a liquid refrigerant that has flowed through the condenser (31). A liquid seal preventing pipe (90) is connected upstream of the condenser (31). A liquid seal open/close valve (91) is provided at a midpoint of the liquid seal preventing pipe (90), and is connected downstream of the main expansion valve (32).

The subcooling heat exchanger (44) cools the liquid refrigerant flowing through the condenser (31). The subcooling heat exchanger (44) includes a primary passage (45) and a secondary passage (46). Specifically, in the subcooling heat exchanger (44), the refrigerant flowing through the primary passage (45) and the refrigerant flowing through the secondary passage (46) exchange heat. The primary passage (45) is connected to the high pressure liquid pipe (25), and the secondary passage (46) is connected to a subcooling branch pipe (26). An inlet end of the subcooling branch pipe (26) is connected between the receiver (41) and the second open/close valve (49). An outlet end of the subcooling branch pipe (26) is connected to a compression chamber in the compressor (30) at an intermediate pressure (intermediate pressure compression chamber). Specifically, the subcooling branch pipe (26) is a passage into which part of the liquid refrigerant in the high pressure liquid pipe (25) is diverted and flows into the intermediate pressure compression chamber of the compressor (30). A first open/close valve (47) and a subcooling expansion valve (48) are provided on the subcooling branch pipe (26) near an inlet of the secondary passage (46). The first open/close valve (47) is a solenoid valve which is freely opened and closed. The degree of opening of the subcooling expansion valve (48) may be adjusted in multiple stages by the pulse motor.

—Hot Gas Bypass Circuit (22)—

The hot gas bypass circuit (22) is a bypass circuit for feeding the refrigerant compressed in the compressor (30) (a high temperature gaseous refrigerant discharged from the compressor (30)) to the evaporator (33). The hot gas bypass circuit (22) includes a main passage (50), a first branch passage (51), and a second branch passage (52). The first and second branch passages (51) and (52) are branched from the main passage (50). An inlet end of the main passage (50) is connected to the high pressure gas pipe (24). A third open/close valve (53) is provided in the main passage (50). The third open/close valve (53) is a solenoid valve which is freely opened and closed.

An end of the first branch passage (51) is connected to an outlet end of the main passage (50), and the other end is connected to the low pressure liquid pipe (27). Likewise, an end of the second branch passage (52) is connected to the outlet end of the main passage (50), and the other end is connected to the low pressure liquid pipe (27). The second branch passage (52) is configured as a refrigerant pipe longer than the first branch passage (51). The second branch passage (52) includes a drain pan heater (54) which extends in a serpentine form on a bottom of the drain pan (37). The drain pan heater (54) is configured to heat the inside of the drain pan (37) with the refrigerant.

—Reheat Circuit (80)—

The reheat circuit (80) forms a circuit for feeding part of the refrigerant compressed in the compressor (30) (a high temperature gaseous refrigerant discharged from the compressor (30)) to the reheat heat exchanger (83). The reheat circuit (80) includes a reheat passage (82). An inlet end of the reheat passage (82) is connected to the high pressure gas pipe (24). A fifth open/close valve (81) is provided in the reheat passage (82). The fifth open/close valve (81) is a solenoid valve which is freely opened and closed. The reheat passage (82) includes the reheat heat exchanger (83) and a capillary tube. The reheat heat exchanger (83) exchanges heat between the discharged refrigerant flown thereinto and air cooled and dehumidified by the evaporator (33) in a dehumidification mode (which will not be described) to heat the air. In this embodiment, the reheat heat exchanger (83) is a fin-and-tube heat exchanger. The capillary tube decompresses the refrigerant flowing out of the reheat heat exchanger (83).

—Other Components of Refrigerant Circuit (20)—

The refrigerant circuit (20) includes various sensors. Specifically, a high pressure sensor (60), a high pressure switch (61), and a discharge temperature sensor (62) are provided on the high pressure gas pipe (24). The high pressure sensor (60) detects the pressure of the high pressure gaseous refrigerant discharged from the compressor (30). The discharge temperature sensor (62) detects the temperature of the high pressure gaseous refrigerant discharged from the compressor (30). A low pressure sensor (63) and a suction temperature sensor (64) are provided on a low pressure gas pipe (28) between the evaporator (33) and the compressor (30). The low pressure sensor (63) detects the pressure of the low pressure gaseous refrigerant sucked into the compressor (30). The suction temperature sensor (64) detects the temperature of the low pressure gaseous refrigerant sucked into the compressor (30).

An inlet temperature sensor (65) and an outlet temperature sensor (66) are provided on the subcooling branch pipe (26). The inlet temperature sensor (65) detects the temperature of the refrigerant immediately before the refrigerant flows into the secondary passage (46). The outlet temperature sensor (66) detects the temperature of the refrigerant immediately after the refrigerant has flowed out of the secondary passage (46).

An inlet temperature sensor (67) is provided on the low pressure liquid pipe (27). The inlet temperature sensor (67) detects the temperature of the refrigerant immediately before the refrigerant flows into the evaporator (33). An outlet temperature sensor (68) is provided on the low pressure gas pipe (28). The outlet temperature sensor (68) detects the temperature of the refrigerant immediately after the refrigerant has flowed out of the evaporator (33).

An outside temperature sensor (69) is provided outside the container near an inlet of the condenser (31). The outside temperature sensor (69) detects the temperature of outside air (i.e., outside temperature) immediately before the air is sucked into the condenser (31). An inlet temperature sensor (70) is provided inside the container near an inlet of the evaporator (33), and an outlet temperature sensor (71) is provided inside the container near an outlet of the evaporator (33). The inlet temperature sensor (70) detects the temperature of inside air (the sucked air temperature RS) immediately before the air passes through the evaporator (33). The outlet temperature sensor (71) detects the temperature of the inside air (the blown air temperature (SS)) immediately after the air has passed through the evaporator (33).

<Controller (100)>

The controller (100) includes a microcomputer and a memory device storing a program for operating the microcomputer, and controls operation of the refrigerant circuit (20). Specifically, the controller (100) controls operations such as a "cooling operation," a "heating operation," and a "defrosting operation," performed in the refrigerant circuit (20). The container refrigeration apparatus (10) includes a control panel with switches operable by a user. The user may use the control panel to send predetermined commands (e.g., a set inside temperature, and the start of a failure diagnosis described below) to the controller (100) or the failure determiner (200).

Each of the operations to be controlled by the controller (100) will now be briefly described.

—Cooling Operation—

In the cooling operation, the first open/close valve (47) and the second open/close valve (49) are opened, and the third open/close valve (53) and the fifth open/close valve (81) are closed. The fourth open/close valve (38) is fully opened, and the degrees of opening of the subcooling expansion valve (48) and the main expansion valve (32) are suitably adjusted. The compressor (30), the outside fan (35), and the inside fan (36) are operated.

The refrigerant compressed in the compressor (30) is condensed in the condenser (31), and then passes through the receiver (41). Part of the refrigerant that has passed through the receiver (41) flows through the low pressure liquid pipe (27) as it is, and the rest of the refrigerant flows into the subcooling branch pipe (26). The refrigerant passing through the low pressure liquid pipe (27) is decompressed by the main expansion valve (32), and then flows through the evaporator (33). In the evaporator (33), the refrigerant absorbs heat of the inside air to evaporate. Thus, the inside air is cooled. The refrigerant evaporated in the evaporator (33) is sucked into the compressor (30), and is compressed again.

The refrigerant that has flowed into the subcooling branch pipe (26) is decompressed to an intermediate pressure by passing through the subcooling expansion valve (48), and then flows through the secondary passage (46) of the subcooling heat exchanger (44). In the subcooling heat exchanger (44), the refrigerant flowing through the primary passage (45) and the refrigerant flowing through the secondary passage (46) exchange heat. As a result, the refrigerant flowing through the primary passage (45) is subcooled, while the refrigerant flowing through the secondary passage (46) evaporates. The refrigerant flowing out of the secondary passage (46) is sucked into the intermediate pressure compression chamber through an intermediate port of the compressor (30).

—Heating Operation—

In the heating operation, the high temperature and high pressure gaseous refrigerant compressed in the compressor (30) bypasses the condenser (31), the receiver (41), the subcooling heat exchanger (44), and the main expansion valve (32) to flow into the evaporator (33). The heating operation is performed when the inside temperature is lower than the target temperature, and the inside of the container is excessively cooled.

In the heating operation, the second open/close valve (49) is closed, and the third open/close valve (53) is opened. The main expansion valve (32) is fully closed. The first open/close valve (47), the fourth open/close valve (38), the fifth open/close valve (81), and the subcooling expansion valve (48) are fully closed in principle. The compressor (30) and the inside fan (36) are operated, while the outside fan (35) is at rest in principle.

The refrigerant compressed in the compressor (30) is fed to the evaporator (33) through the hot gas bypass circuit (22). Specifically, the high temperature and high pressure gaseous refrigerant flows through the main circuit (21), and is then diverted to the first branch passage (51) and the second branch passage (52). The refrigerant diverted to the second branch passage (52) passes through the drain pan heater (54), and merges with the refrigerant flowing from the first branch passage (51). The merged refrigerant flows into the evaporator (33). The refrigerant dissipates heat to the inside air in the evaporator (33). As a result, the inside air is heated, and the inside temperature can thus approach the target temperature. The refrigerant that has dissipated heat in the evaporator (33) is sucked into the compressor (30) and compressed therein.

—Defrosting Operation—

Continuing the cooling operation causes frost to form on surfaces of a heat transfer tube and other components of the evaporator (33). This frost grows gradually to increase in size. To address this problem, the container refrigeration apparatus (10) performs an operation for defrosting the evaporator (33) (i.e., the defrosting operation).

In the defrosting operation, the high temperature and high pressure gaseous refrigerant compressed in the compressor (30) bypasses the condenser (31), the receiver (41), the subcooling heat exchanger (44), and the main expansion valve (32) to flow directly into the evaporator (33). In the defrosting operation, the third open/close valve (53) is opened, and the second open/close valve (49) is fully closed. The first open/close valve (47), the fourth open/close valve (38), the fifth open/close valve (81), and the subcooling expansion valve (48) are fully closed in principle. The compressor (30) starts operating, while the outside fan (35) and the inside fan (36) stop in principle.

The refrigerant compressed in the compressor (30) is fed to the evaporator (33) through the hot gas bypass circuit (22). Specifically, the high pressure gaseous refrigerant flows through the main circuit (21), then passes through the third open/close valve (53), and is diverted to the first branch passage (51) and the second branch passage (52). The refrigerant diverted to the second branch passage (52) passes through the drain pan heater (54). At this time, the drain pan (37) has collected ice blocks and other substances falling from the surface of the evaporator (33). The ice blocks and other substances are heated by the refrigerant flowing through the drain pan heater (54), and thus melt. The resultant water is discharged to the exterior of the container through a predetermined channel. The refrigerant flowing from the drain pan heater (54) merges with the refrigerant passing through the first branch passage (51). The merged refrigerant flows through the evaporator (33). In the evaporator (33), the high pressure gaseous refrigerant (so-called hot gas) circulates through the heat transfer tube. This allows the frost forming around the heat transfer tube to be gradually heated from its inner surface with the refrigerant in the evaporator (33). As a result, the drain pan (37) gradually collects the frost forming on the evaporator (33). The refrigerant used to defrost the evaporator (33) is sucked into the compressor (30), and is compressed.

<Failure Determiner (200)>

The failure determiner (200) diagnoses a failure in the container refrigeration apparatus (10). In this failure diagnosis, the functions of individual components of the refrigerant circuit (20) and the overall refrigerant circuit (20) are successively evaluated for a plurality of evaluation items.

The failure determiner (200) includes a diagnosis controller (210), and a recorder (220). A main part of each of the diagnosis controller (210) and the recorder (220) may include a microcomputer and a memory device storing a program for operating the microcomputer. The microcomputer may serve as that of the controller (100), too, or may be separate from that of the controller (100).

—Diagnosis Controller (210)—

The diagnosis controller (210) sends predetermined commands to the controller (100) to actuate components of the refrigerant circuit (20), thereby diagnosing a failure as described above. In this embodiment, two types of evaluations (a first type of evaluation items, a second type of evaluation items) indicated below are mainly performed. First, the first type of evaluation items include evaluations on the components of the refrigerant circuit (20), such as sensors. The second type of evaluation items include evaluations on the functions of combinations of predetermined ones of the components. The evaluations included in the second type of evaluation items include an evaluation on the function of the overall refrigerant circuit (20). The second type of evaluation items are evaluated after the evaluations of the first type of evaluation items have ended. This is because the second type of evaluation items are evaluated on the premise that the individual components of the refrigerant circuit (20) function normally. The first and second types of evaluation items evaluated in this embodiment will be described in detail below.

The diagnosis controller (210) checks data recorded by the recorder (220) (described below) when the container refrigeration apparatus (10) is started (when a power switch is turned on). If the failure diagnosis has been interrupted, the diagnosis controller (210) functions to restart the failure diagnosis.

—Recorder (220)—

The recorder (220) records the progress of the failure diagnosis. Examples of the data recorded by the recorder (220) include evaluation items that have been evaluated, the time when each evaluation item starts being evaluated, the time when the evaluation item has been evaluated, evaluation results, and the halfway progress of an evaluation being performed. For example, if a temperature sensor is used for an evaluation item being evaluated, its sensed value (i.e., a temperature) and its sensing time (or the time that has elapsed since the start of evaluation) are recorded as a pair. The record of the recorder (220) is recorded in a nonvolatile memory so as to be able to be retained even if power is not supplied to the container refrigeration apparatus (10).

<Display (250)>

The display (250) includes a display device (e.g., a liquid crystal panel), and displays pieces of information concerning the container refrigeration apparatus (10). Various pieces of information are displayed on the display (250). For example, the display (250) displays a piece of information concerning a failure diagnosis in accordance with an instruction from the failure determiner (200) (more specifically, an instruction from the diagnosis controller (210)). Examples of the pieces of information concerning the failure diagnosis include a piece of information indicating whether a normal failure diagnosis is performed or an interrupted failure diagnosis is restarted, which will be described in detail below, and the number of times that a failure diagnosis has been performed.

Figure 2:
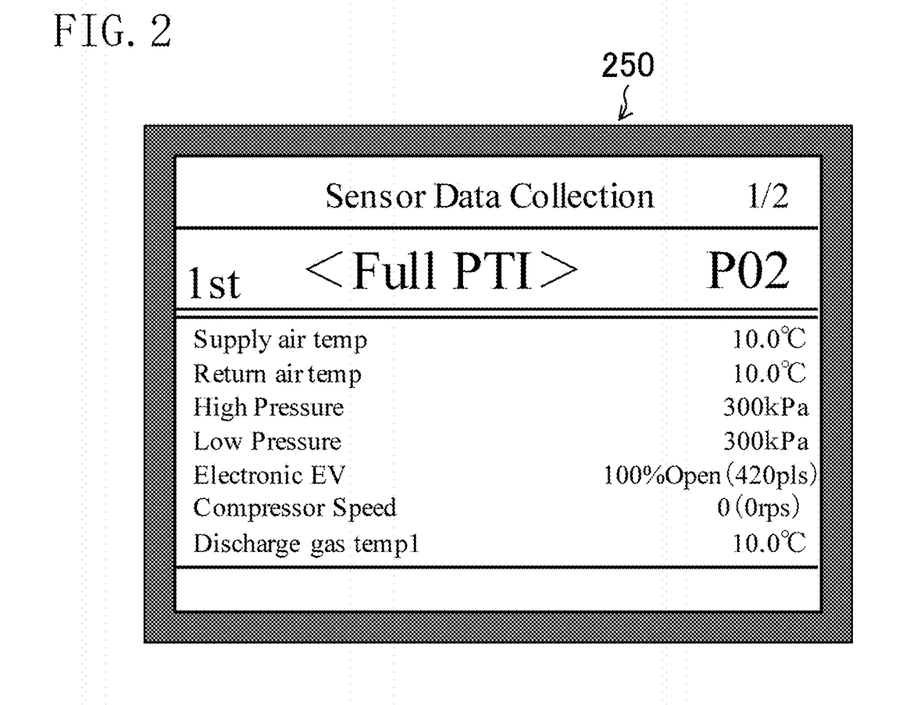
FIG. 2 shows an exemplary way to display, on a display, the number of failure diagnoses performed.

Note that the "number of times" as used herein means the number of times that a failure diagnosis has been performed since a user instructed the failure determiner (200) to start a failure diagnosis. Specifically, a failure diagnosis performed for the first time after the user has instructed the failure determiner (200) to start a failure diagnosis (i.e., a normal failure diagnosis) is identified as the first failure diagnosis. FIG. 2 shows an exemplary way of displaying, on the display (250), the number of times that a failure diagnosis has been performed. In this example, the string "1st" indicating the first failure diagnosis is displayed. In other words, FIG. 2 shows that a normal failure diagnosis is being performed.

The display (250) displays the number of times counted up every time a failure diagnosis is restarted, such as 2nd or 3rd. The display of "2nd," for example, indicates that a normal failure diagnosis is interrupted, and the interrupted failure diagnosis is restarted once. Note that if the failure diagnosis has been completed or has been forcibly terminated (as described below), the count of the number of times is cleared to zero.

<Evaluation Items of Failure Diagnosis and Restart>

—First Type of Evaluation Items—

A plurality of evaluation items of the first type are evaluated for the container refrigeration apparatus (10). The items (referred to also as a group of evaluation items of the first type) are evaluated in a predetermined sequence. Examples of the first type of evaluation items include evaluations on the temperature sensors and the pressure sensors provided for the refrigerant circuit (20), and an evaluation on an alarm of each sensor. The refrigerant circuit (20) is provided with the high pressure sensor (60), the low pressure sensor (63), and other sensors. The high pressure sensor (60) is evaluated as one of the "first type of evaluation items," and the low pressure sensor (63) is evaluated as another one of the "first type of evaluation items." Likewise, evaluations on the temperature sensors, such as the inlet temperature sensor (70) and the outlet temperature sensor (71) (see a description of the refrigerant circuit (20) for details on the evaluations) are also exemplary ones of the first type of evaluation items. Evaluations of the outside fan (35) and the inside fan (36) also fall within the first type of evaluation items.

The refrigerant circuit (20) includes various valves, such as the main expansion valve (32). Evaluations on the opening/closing operations of these valves also fall within the first type of evaluation items. When these valves are evaluated, the compressor (30) may be actuated. This is because these valves may be evaluated with a predetermined state (e.g., the pressure of the refrigerant) recovered.

(Restart of Evaluation of First Type of Evaluation Items)

If an evaluation on any one of the first type of evaluation items is interrupted, the interrupted failure diagnosis is restarted in the container refrigeration apparatus (10) from an evaluation on the first item in the group of evaluation items of the first type. This is because the second type of evaluation items are evaluated on the premise that the individual components function normally, and it may be recommended that the first type of evaluation items be carefully evaluated in order to perform a more reliable failure diagnosis. Naturally, the failure determiner (200) may be configured so that the failure diagnosis may be restarted from an evaluation on an interrupted item in the group of evaluation items of the first type with the user's convenience taken into account. This allows an evaluation that has already finished (e.g., an evaluation on the temperature sensor) to be omitted, thereby more efficiently performing a failure diagnosis.

—Second Type of Evaluation Items—

The second type of evaluation items are evaluated mainly to determine the functions of combinations of predetermined components, such as the refrigerating and freezing functions of the refrigerant circuit (20). In the container refrigeration apparatus (10), evaluation items indicated below are evaluated.

(1) Pull-Down Evaluation of Refrigerating Operation

In this evaluation, the time (t) during which the refrigerating operation reduces the outlet air temperature (SS) from 10° C. to 1° C. is measured, and whether or not the time (t) is equal to or shorter than a criterion value (e.g., 120 minutes) determines whether the refrigerating operation passes or fails. Note that the outlet air temperature (SS) is sensed by the outlet temperature sensor (71). In this evaluation, if the outlet air temperature at the start of evaluation is lower than 10° C., the heating operation initially increases the temperature to above 10° C., and then a refrigerating operation is performed. If the outlet air temperature at the start of evaluation is higher than or equal to 10° C., a refrigerating operation is started at once.

(Restart of "Pull-Down Evaluation of Refrigerating Operation")

The container refrigeration apparatus (10) has two modes (first and second modes) indicated below to restart a failure diagnosis in which the "pull-down evaluation of refrigerating operation" has been interrupted. A user (an operator) may select which of the modes he/she wants to use. Among these modes, the first mode is a mode in which the "pull-down evaluation of refrigerating operation" is performed all over again.

On the other hand, in the second mode, the "pull-down evaluation of refrigerating operation" may be restarted from its intermediate point. Specifically, in the second mode, the failure diagnosis of the container refrigeration apparatus (10) is restarted as indicated below in accordance with the magnitude relation between the outlet air temperature (SS2) at the time of the restart and the outlet air temperature (SS1) at the time of interruption of the evaluation, where the outlet air temperature (SS1) represents the outlet air temperature (SS) at the time of the interruption, and the time (t1) represents the time that it takes to reach the outlet air temperature (SS1).

(i) SS2≤SS1

In this case, heating operation increases the outlet air temperature (SS) to SS1. Then, refrigerating operation is performed, and the time (t2) during which the outlet air temperature (SS) changes from SS1 to 1° C. is measured. The time t that it takes for the outlet air temperature (SS) to decrease from 10° C. to 1° C. is determined by t1+t2.

(ii) SS2>SS1 and SS2≤10° C.

In this case, heating operation is unnecessary, and refrigerating operation is performed at once. The time (t2) during which the outlet air temperature (SS) changes from SS1 to 1° C. is measured. The time t that it takes for the outlet air temperature (SS) to decrease from 10° C. to 1° C. is determined by t1+t2.

(iii) SS2>10° C.

In this case, the same operation as in the first mode is performed.

As can be seen from the foregoing description, in the cases (i) and (ii), an evaluation may be considered to be restarted from the stage at which the time t1 has elapsed since the start of the evaluation. On the other hand, in the case (iii), the "pull-down evaluation of refrigerating operation" itself is performed all over again. In any of the cases (i)-(iii), if the time (t) that it takes for the outlet air temperature to decrease from 10° C. to 1° C. is determined, the diagnosis controller (210) compares the time (t) to the criterion value (in this example, 120 minutes) to determine an evaluation result.

To achieve the restart operation, the recorder (220) periodically monitors the output of the outlet temperature sensor (71) to record the output value. The diagnosis controller (210) uses the outlet air temperature (SS) recorded by the recorder (220) at the timing closest to the interruption as the outlet air temperature (SS1) at the time of the interruption. In any of the modes, it is recommended that control over the rotational speed of the compressor (30) and the valves (referred to also as start control) be performed at the time of the restart such that no excessive load is placed on the compressor (30) to protect the compressor (30). A similar statement will now apply to the restart of an evaluation on each of other evaluation items.

(2) Evaluation of Whether or not Refrigerating Temperature is Maintained

In this evaluation, an evaluation is made of whether a predetermined temperature may be maintained by refrigerating operation. In this example, refrigerating operation is performed to evaluate whether or not the operation may be continuously performed for 10 minutes at an outlet air temperature (SS) of 0° C.

(Restart of "Evaluation of Whether or Not Refrigerating Temperature is Maintained")

The "evaluation of whether or not the refrigerating temperature is maintained" is performed all over again to restart the failure diagnosis in which the "evaluation of whether or not the refrigerating temperature is maintained" has been interrupted. This is because the "evaluation of whether or not the refrigerating temperature is maintained" is performed on the premise that operation is continuously performed for a predetermined time, and is unsuitable to be restarted from an intermediate point of the evaluation of the evaluation item.

(3) Evaluation of Defrosting Operation

In this evaluation, defrosting operation is performed, and the time required for the defrosting operation is measured. Whether or not the time is shorter than or equal to a criterion value (e.g., 90 minutes) determines whether the defrosting operation passes or fails.

(Restart of "Evaluation of Defrosting Operation")

The "evaluation of the defrosting operation" is performed all over again to restart the failure diagnosis in which the "evaluation of the defrosting operation" has been interrupted.

(4) Pull-Down Evaluation of Freezing Operation

In this evaluation, the time (t) during which the freezing operation reduces the inlet air temperature (RS) from 0° C. to −18° C. is measured, and whether or not the time (t) is equal to or shorter than a criterion value (e.g., 180 minutes) determines whether the freezing operation passes or fails. Note that the inlet air temperature (RS) is sensed by the inlet temperature sensor (70). In this evaluation, if the inlet air temperature (RS) at the start of evaluation is lower than 0° C., the heating operation initially increases the temperature to above 0° C. (in this embodiment, 3° C.), and then a freezing operation is performed. If the inlet air temperature (RS) at the start of evaluation is higher than or equal to 3° C., a freezing operation is started at once. The reason why the freezing operation is controlled using the inlet air temperature (RS) is that in the freezing operation, it is important for the inside temperature to decrease to a target temperature with reliability, and to satisfy the importance, controlling the freezing operation based on the inlet air temperature (RS) higher than the outlet air temperature (SS) allows the temperature to be more reliably controlled.

(Restart of "Pull-Down Evaluation of Freezing Operation")

The way of thinking about the restart of evaluation of this evaluation item is the same as or similar to that about the restart of the "pull-down evaluation of the refrigerating operation" that has already been described. Specifically, the container refrigeration apparatus (10) has two modes (first and second modes) indicated below to restart a failure diagnosis in which the "pull-down evaluation of freezing operation" has been interrupted The user (operator) may select which of the modes he/she wants to use. Among these modes, the first mode is a mode in which the "pull-down evaluation of the freezing operation" is performed all over again.

On the other hand, in the second mode, the "pull-down evaluation of the freezing operation" may be restarted from its intermediate point. Specifically, in the second mode, the failure diagnosis of the container refrigeration apparatus (10) is restarted as indicated below in accordance with the magnitude relation between the inlet air temperature (RS2) at the time of the restart and the inlet air temperature (RS1) at the time of interruption of the evaluation, where the inlet air temperature (RS1) represents the inlet air temperature (RS) at the time of the interruption, and the time (t1) represents the time that it takes to reach the inlet air temperature (RS1).

(i) RS2≤RS1

In this case, heating operation increases the inlet air temperature (RS) to RS1. Then, freezing operation is performed, and the time (t2) during which the inlet air temperature (RS) changes from RS1 to −18° C. is measured. The time t that it takes for the inlet air temperature (RS) to decrease from 0° C. to −18° C. is determined by t1+t2.

(ii) RS2>RS1 and RS2≤0° C.

In this case, heating operation is unnecessary, and freezing operation is performed at once. The time (t2) during which the inlet air temperature (RS) changes from RS1 to −18° C. is measured. The time t that it takes for the inlet air temperature (RS) to decrease from 0° C. to −18° C. is determined by t1+t2.

(iii) RS2>10° C.

In this case, the same operation as in the first mode is performed.

As can be seen from the foregoing description, in the cases (i) and (ii), an evaluation may be considered to be restarted from the stage at which the time t1 has elapsed since the start of the evaluation. On the other hand, in the case (iii), the "pull-down evaluation of the freezing operation" itself is performed all over again. In any of the cases (i)-(iii), if the time (t) that it takes for the inlet air temperature (RS) to decrease from 0° C. to −18° C. is determined, the diagnosis controller (210) compares the time (t) to the criterion value (in this example, 180 minutes) to determine an evaluation result.

To achieve the restart operation, the recorder (220) periodically monitors the output of the inlet temperature sensor (70) to record the output value. The diagnosis controller (210) uses the inlet air temperature (RS) recorded by the recorder (220) at the timing closest to the interruption as the inlet air temperature (RS1) at the time of the interruption.

(5) Evaluation of Whether Freezing Temperature is Maintained

In this evaluation, an evaluation is made of whether a predetermined temperature may be maintained by freezing operation. In this example, freezing operation is performed to evaluate whether or not the operation may be continuously performed for 10 minutes at an inlet air temperature (RS) of −18° C. (a set temperature=−18° C.).

(Restart of "Evaluation of Whether or not Freezing Temperature is Maintained")

The "evaluation of whether or not the freezing temperature is maintained" is performed all over again to restart the failure diagnosis in which the "evaluation of whether or not the freezing temperature is maintained" has been interrupted. This is because the "evaluation of whether or not the freezing temperature is maintained" is performed on the premise that operation is continuously performed for a predetermined time, and is unsuitable to be restarted from an intermediate point of the evaluation of the evaluation item.

<Implementation of Failure Diagnosis>

It takes a relatively long time (e.g., 3 hours) to diagnose a failure in the container refrigeration apparatus. Thus, in some cases, an operator starts a failure diagnosis before leaving, and a failure diagnosis is performed outside his/her working hours. However, a commercial power supply has low reliability depending on the location at which the container is placed, for example. While the operator is not monitoring the failure diagnosis, the failure diagnosis may be interrupted due to a power failure, a voltage drop, or any other factor. To address this problem, the failure diagnosis of the container refrigeration apparatus (10) of this embodiment is automatically restarted as indicated below.

If the container refrigeration apparatus (10) recovers from abnormal power conditions, such as a power failure, so that a normal power supply is restarted, the diagnosis controller (210) checks data recorded by the recorder (220). For example, if the failure diagnosis has finished normally (it has been recorded that all of the evaluation items has finished being evaluated), operation of the failure determiner (200) is terminated, and the controller (100) waits for the operator's entry. On the other hand, if the failure diagnosis has been interrupted (it has not been recorded that the evaluation items have been evaluated to the end), the diagnosis controller (210) restarts the failure diagnosis.

Figure 3:
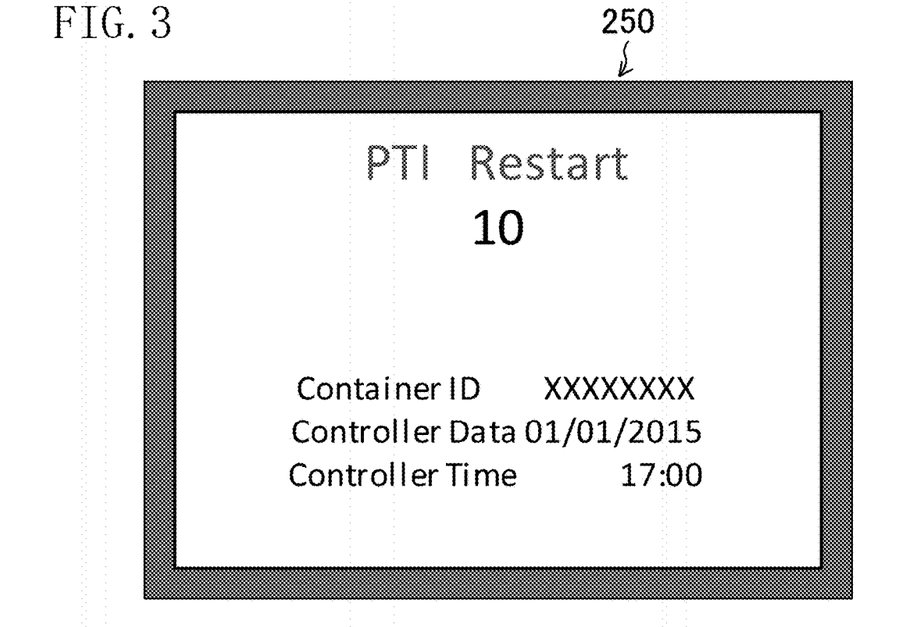
FIG. 3 shows exemplary indications to be displayed on a display if a restart operation is started.

At this time, the display (250) displays information indicating that the diagnosis controller (210) restarts the failure diagnosis. FIG. 3 shows exemplary indications to be displayed on the display (250) if a restart operation is started. In this example, the string "Restart" is displayed together with "PTI" which is an abbreviation of the failure diagnosis in this embodiment. Note that PTI is an abbreviation for "Pre-Trip Inspection." The display (250) also displays the number of seconds left before the start of the failure diagnosis (in the example shown in FIG. 3, 10 seconds). The number of the seconds is appropriately counted down.

Figure 4:
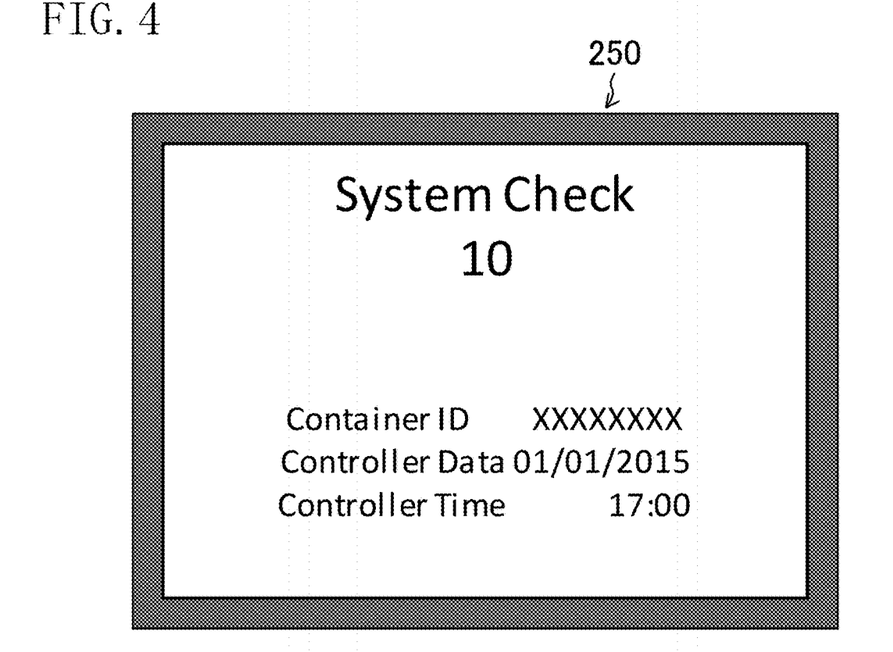
FIG. 4 shows exemplary indications to be displayed on a display if a normal failure diagnosis is started.

FIG. 4 shows exemplary indications to be displayed on the display (250) if a normal failure diagnosis is started. The "normal failure diagnosis" as used herein means a failure diagnosis performed for the first time after the user has instructed the failure determiner to start a failure diagnosis. In this example, the string "System Check" is displayed, and allows a situation where the normal failure diagnosis is being performed to be distinguished from a situation where the restarted failure diagnosis is being performed. Also in this case, the number of seconds left before the start of the diagnosis (in the example shown in FIG. 4, 10 seconds) is displayed. The number of the seconds is also appropriately counted down.

If the failure diagnosis is restarted, the diagnosis controller (210) has the display (250) display the counted-up number of failure diagnoses performed.

For example, if the failure diagnosis is interrupted during the evaluation of the first type of evaluation items, the diagnosis controller (210) restarts the failure diagnosis from the first item in the group of evaluation items of the first type. If the failure diagnosis is interrupted during the evaluation of any of the evaluation items of the second type, the point at which the failure diagnosis is restarted varies according to whether or not the interrupted evaluation of the evaluation item may be restarted from its intermediate point.

The "pull-down evaluation of the refrigerating operation" and the "pull-down evaluation of the freezing operation" may be able to be restarted from their respective intermediate points in the second mode as described above. For example, if the user selects the second mode for the "pull-down evaluation of the refrigerating operation," the failure diagnosis is assumed to be interrupted in the middle of the evaluation.

In this case, when a normal power supply is restarted, the diagnosis controller (210) checks data recorded by the recorder (220), and determines the outlet air temperature (SS1) at the time of the interruption and the time (t1) that it takes to reach the outlet air temperature (SS1). For example, in the cases (i) SS2≤SS1 and (ii) SS2>SS1 and SS2≤10° C., assuming that the time has been measured until the outlet air temperature (SS) decreases to SS1, the evaluation is performed. In other words, the "pull-down evaluation of the refrigerating operation" is restarted from its intermediate point.

If the outlet air temperature (SS2) at the restart is lower than 10° C., the "pull-down evaluation of the refrigerating operation" is performed all over again. If the user selects the first mode in the "pull-down evaluation of the refrigerating operation" and the "pull-down evaluation of the freezing operation," this evaluation item is also evaluated all over again as has been expected. Some items, such as the "evaluation of whether or not the refrigerating temperature is maintained," cannot (or are not recommended to) be restarted from their intermediate points. Such evaluation items are evaluated all over again.

Advantages of this Embodiment

Figure 5:
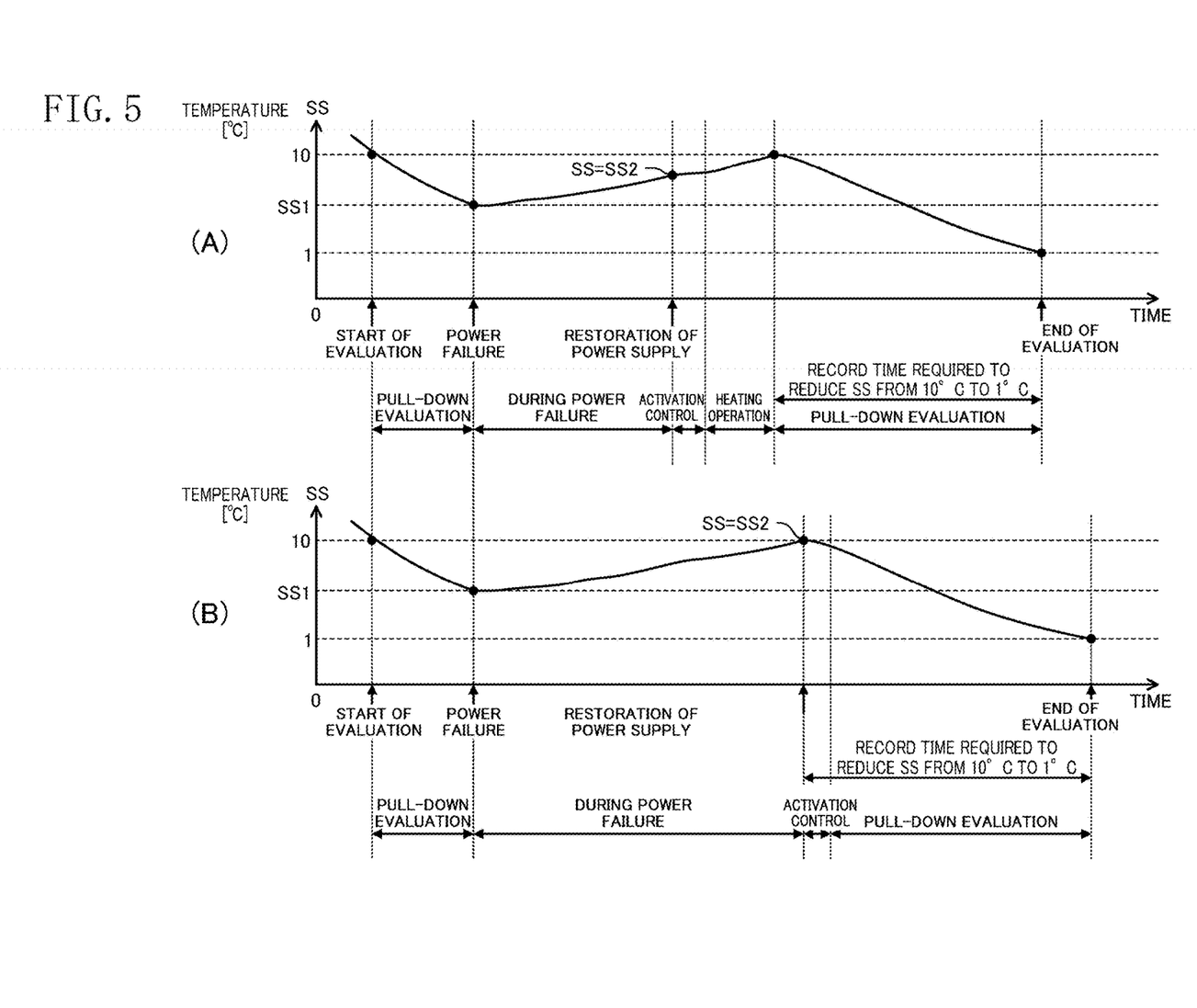
FIG. 5 shows timing charts showing a process of restarting a "pull-down evaluation of refrigerating operation" using a first mode.

FIG. 5 shows timing charts in which the "pull-down evaluation of the refrigerating operation" is restarted using the first mode. In FIG. 5, the ordinate represents the outlet air temperature (SS). During a power failure, air is not issued. However, in FIG. 5, a value sensed by the outlet temperature sensor (71) is referred to as the outlet air temperature even during a power failure. A portion (A) of FIG. 5 shows a situation where the outlet air temperature (SS2) at the restart is lower than or equal to 10° C., and a portion (B) thereof shows a situation where the outlet air temperature (SS2) at the restart is higher than 0° C.

As shown in FIG. 5, a failure diagnosis of the container refrigeration apparatus (10) is automatically restarted after restoration of power. This is useful if, for example, an operator starts a failure diagnosis at the timing when he/she leaves his/her office, and has the container refrigeration apparatus undergo the failure diagnosis during nighttime hours. In other words, for example, in a situation where a power failure occurs in the middle of the night in which no operator is present, if a power supply is restored before an operator starts working the next morning, the failure diagnosis may finish earlier in this embodiment than if an operator manually restarts the failure diagnosis the next morning.

Figure 6:
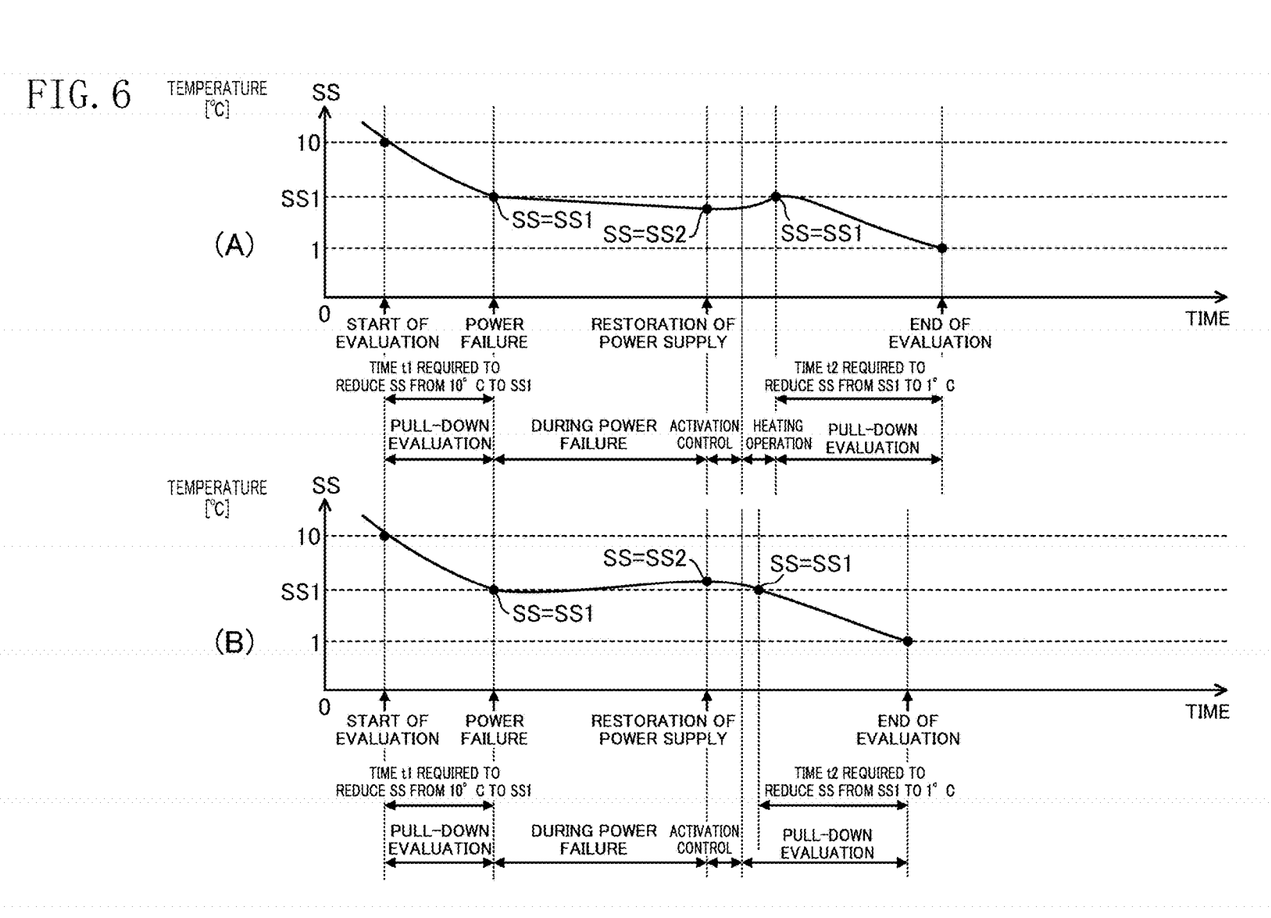
FIG. 6 shows timing charts showing a process of restarting a "pull-down evaluation of refrigerating operation" using a second mode.

FIG. 6 shows timing charts in which the "pull-down evaluation of the refrigerating operation" is restarted using the second mode. A portion (A) of FIG. 6 shows a situation where the outlet air temperature (SS2) at the restart is lower than or equal to the outlet air temperature (SS1) at the time of the interruption, and a portion (B) thereof shows a situation where SS2 is higher than SS1. For example, if the air temperature (outside temperature) at the location of the container is relatively low, the outlet air temperature (SS) (substantially the inside temperature) may decrease gradually during a power failure as shown in the portion (A).

In the second mode, as shown in FIG. 6, the failure diagnosis is automatically restarted from an intermediate point of the "pull-down evaluation of the refrigerating operation" after restoration of a power supply. Thus, in the second mode, the failure diagnosis may finish earlier than in the first mode.

As can be seen from the foregoing description, this embodiment may reduce the time loss caused by interrupting the failure diagnosis.

Second Embodiment of the Invention

Figure 7:
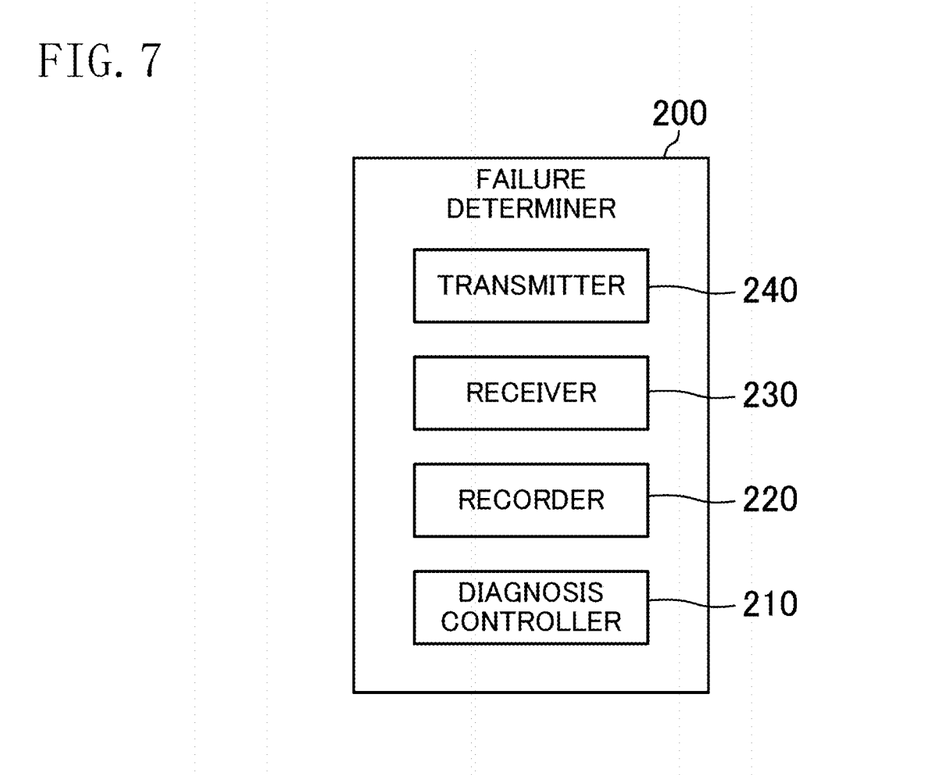
FIG. 7 is a block diagram showing a configuration for a failure determiner according to a second embodiment of the present invention.

FIG. 7 is a block diagram showing a configuration for a failure determiner (200) according to a second embodiment of the present invention. The failure determiner (200) according to this embodiment is obtained by adding a receiver (230) and a transmitter (240) to the failure determiner (200) of the first embodiment and modifying the diagnosis controller (210).

The receiver (230) receives an instruction to restart a failure diagnosis from a user via telecommunication. In this example, the receiver (230) may communicate with (receive data from) a mobile telecommunications terminal device (e.g., a so-called smartphone). In this embodiment, if the receiver (230) receives an instruction to restart a failure diagnosis, the diagnosis controller (210) stores the instruction, and implements the restarting function if the failure diagnosis is ready for restarting. In other words, in this embodiment, the user may issue an instruction to restart the failure diagnosis from a remote site.

The diagnosis controller (210) periodically monitors the state (e.g., the voltage) of a commercial power supply, and if the failure diagnosis is interrupted, notifies a previously determined mobile telecommunications terminal device (such as a user's smartphone) of information indicating the interruption of the diagnosis. This notification is provided via the transmitter (240). Specifically, if the failure diagnosis is interrupted, the transmitter (240) notifies the user of the information indicating the interruption via telecommunication. Examples of the ways how the transmitter (240) notifies the user of the information include various ways such as by e-mail and by starting a software program which has been loaded into the user's smartphone and which displays, on a screen, the interruption of the diagnosis. In this embodiment, the failure determiner (200) includes a battery so that the diagnosis controller (210) and the transmitter (240) can operate even during a power failure.

<Restart of Failure Diagnosis>

In this embodiment, the diagnosis controller (210) periodically monitors the state of the commercial power supply. Thus, if abnormal conditions of the power supply, such as a condition where the failure diagnosis is interrupted (e.g., a power failure), are sensed, the diagnosis controller (210) transmits (provides a notification of) information indicating the interruption of the failure diagnosis via the transmitter (240). This allows the user to receive the information with a mobile telecommunications terminal device or any other device. If the user transmits, to the failure determiner (200), an instruction to restart the failure diagnosis, the diagnosis controller (210) restarts the failure diagnosis when the power supply is restored. Naturally, if the user determines that the failure diagnosis does not need to be restarted, he/she may merely neglect the notification.

Advantages of this Embodiment

In this embodiment, the time loss may be reduced by restarting a failure diagnosis from its intermediate point as in the first embodiment.

In this embodiment, in a situation where the failure diagnosis is interrupted, the user may immediately know this situation. Thus, immediately after the power supply is restored, the failure diagnosis may be restarted. This embodiment is useful, for example, if an operator performs another task while having the container refrigeration apparatus undergo a failure diagnosis during his/her working hours.

In addition, in this embodiment, the user may determine whether or not the failure diagnosis needs to restart. This also allows the container to be effectively used.

The mobile telecommunications terminal device according to this embodiment is not limited to a so-called smartphone.

Other Embodiments (1) The restarting function may be unnecessary for some of users. Thus, the failure determiner (200) may be designed so that such users may determine whether or not the restarting function is available. This improves the users' convenience.

(2) In some cases, some of the users who have determined the restarting function to be available also do not want the failure diagnosis to restart depending on circumstances. Thus, to satisfy such users' demand, the failure determiner (200) may function to forcibly terminate an operation related to the restart in accordance with the user's instruction entered. The "operation related to the restart" as used herein includes an operation performed in a stage in which the failure determiner (200) has not started the failure diagnosis yet (a preparatory stage) and an operation performed in a stage in which the failure diagnosis has been restarted. In a situation where the user starts a new failure diagnosis, the failure diagnosis is restarted as necessary irrespective of the forcible termination unlike in a situation where the user determines the restarting function itself to be unavailable.

(3) A restart operation may be automatically forcibly terminated. For example, in situations where the user performs a predetermined manipulation, it may be recommended that the failure diagnosis not be restarted. Specifically, examples of such situations include a situation where the user turns off a power switch of the container refrigeration apparatus (10) while the failure diagnosis is being performed, and a situation where the user operates a control board of the container refrigeration apparatus (10) to program something.

(4) If a predetermined period of time (e.g., three days) has elapsed since the power supply of the container refrigeration apparatus (10) turned off to interrupt the failure diagnosis, the restart operation may be automatically forcibly terminated, or a command to restart the failure diagnosis may be prevented from being accepted. This is because, if the period of time during which the failure diagnosis is interrupted is relatively long as described above, it may be recommended that the conditions of the container refrigeration apparatus (10), the power source, and other components be checked, and then whether or not the failure diagnosis is required be considered again, in order to allow the evaluation to have high reliability.

(5) The number of restarts may be limited. For example, in the region where the commercial power supply is unstable, the interruption and restart of the failure diagnosis may be repeated, and the failure diagnosis may be prevented from finishing for a prolonged period. In such a case, if the commercial power supply enters into a stable state, and then the failure diagnosis is performed again, the reliability of the diagnosis may be higher than if the restart is repeated.

(6) Both of the restarting functions according to the first and second embodiments may be incorporated into the failure determiner (200) so that the user may select which of the modes is used to restart the failure diagnosis. This improves the user's convenience.

(7) The evaluation items described in the embodiments, the conditions where these evaluations are performed, and the values against which the evaluations are performed are examples.

INDUSTRIAL APPLICABILITY

The present invention is useful as a container refrigeration apparatus to cool the interior of a container.

DESCRIPTION OF REFERENCE CHARACTERS

10 Container Refrigeration Apparatus
20 Refrigerant Circuit
200 Failure Determiner
220 Recorder
240 Receiver
250 Transmitter

The invention claimed is:

1. A container refrigeration apparatus including a refrigerant circuit, the apparatus comprising:
a non-volatile memory; and
a failure determining processor configured to
perform a failure diagnosis to successively evaluate in a predetermined sequence a plurality of evaluation items, the plurality of evaluation items including a first type which evaluates functioning of individual components of the container refrigeration apparatus and a second type which evaluates functioning of a combination of the individual components, and
store, in said non-volatile memory, data associated with progress of the failure diagnosis, wherein
the first type of evaluation items are evaluated prior to the second type of evaluation items, and
if the failure diagnosis is interrupted due to a loss of power from a power supply of the container refrigeration apparatus, the failure determining processor is configured to restart the failure diagnosis from an intermediate point of the failure diagnosis based on the stored progress data.

2. The container refrigeration apparatus of claim 1, wherein the failure determining processor is configured to restart the interrupted failure diagnosis from a beginning of an evaluation of one of the plurality of evaluation items, an evaluation of which was interrupted.

3. The container refrigeration apparatus of claim 2, wherein the failure determining processor is configured to restart the interrupted failure diagnosis from an intermediate point of an evaluation of one of the plurality of evaluation items, an evaluation of which was interrupted.

4. The container refrigeration apparatus of claim 3, wherein
if an evaluation of a first type of evaluation item is interrupted, the failure determining processor is configured to restart the failure diagnosis from the evaluation of the first type of evaluation item.

5. The container refrigeration apparatus of claim 3, wherein
the failure determining processor is further configured to check the progress data stored in said memory, after being started, to identify any evaluation items that have not been evaluated yet, and
perform evalutaion of the identified evaluation items.

6. The container refrigeration apparatus of claim 2, wherein
if an evaluation of a first type of evaluation item is interrupted, the failure determining processor is configured to restart the failure diagnosis from the evaluation of the first type of evaluation item.

7. The container refrigeration apparatus of claim 6, wherein
the failure determining processor is further configured to check the progress data stored in said memory, after being started, to identify any evaluation items that have not been evaluated yet, and
perform evaluation of the identified evaluation items.

8. The container refrigeration apparatus of claim 2, wherein
the failure determining processor is further configured to check the progress data stored in said memory, after being started, to identify any evaluation items that have not been evaluated yet, and perform evaluation of the identified evaluation items.

9. The container refrigeration apparatus of claim 1, wherein the failure determining processor is configured to restart the interrupted failure diagnosis from an intermediate point of an evaluation of one of the plurality of evaluation items, an evaluation of which wass interrupted.

10. The container refrigeration apparatus of claim 9, wherein if an evaluation of a first type of evaluation items is interrupted, the failure determining processor is configured to restart the failure diagnosis from the evaluation of the first type of evaluation item.

11. The container refrigeration apparatus of claim 9, wherein the failure determining processor is further configured to check the progress data stored in said memory, after being started, to identify any evaluation items that have not been evaluated yet, and perform evaluation of the identified evaluation items.

12. The container refrigeration apparatus of claim 1, wherein if an evaluation of a first type of evaluation item is interrupted, the failure determining processor is configured to restart the failure diagnosis from the evaluation of the first type of evaluation items.

13. The container refrigeration apparatus of claim 12, wherein the failure determining processor is further configured to check the progress data stored in said memory, after being started, to identify any evaluation items that have not been evaluated yet, and perform evaluation of the identified evaluation items.

14. The container refrigeration apparatus of claim 1, wherein the failure determining processor is further configured to check the progress data stored in said memory after being started, to identify any evaluation items that have not been evaluated yet, and perform evaluation of the identified evaluation items.

15. The container refrigeration apparatus of claim 1, further comprising:

a transmitter configured to notify a user, via telecommunication, of interruption of the failure diagnosis if the failure diagnosis is interrupted; and a receiver configured to receive an instruction to restart the failure diagnosis via telecommunication, wherein if the receiver has received the instruction to restart the failure diagnosis, the failure determining processor restarts the failure diagnosis.

16. The container refrigeration apparatus of claim 1, wherein the container refrigeration apparatus has a function to select whether or not the restarting function is available in accordance with a user's instruction entered.

17. The container refrigeration apparatus of claim 1, wherein the failure determining processor is configured to forcibly terminate an operation related to a restart in accordance with a user's instruction entered.

18. The container refrigeration apparatus of claim 1, wherein if a predetermined period of time has elapsed since the power supply of the container refrigeration apparatus turned off to interrupt the failure diagnosis, the failure determining processor is configured to forcibly terminate an operation related to a restart.

19. The container refrigeration apparatus of claim 1, further comprising:

a display configured to display what number failure diagnosis is being performed after receipt of a user's instruction to start a diagnosis.

20. The container refrigeration apparatus of claim 1, further comprising:

a display configured to display what number failure diagnosis is being performed after receipt of a user's instruction to start a diagnosis.

* * * * *

UNITED STATES PATENT AND TRADEMARK OFFICE
CERTIFICATE OF CORRECTION

PATENT NO. : 10,480,846 B2
APPLICATION NO. : 15/526449
DATED : November 19, 2019
INVENTOR(S) : Yuusuke Fujimoto et al.

It is certified that error appears in the above-identified patent and that said Letters Patent is hereby corrected as shown below:

On the Title Page

On page 2, under item (56) References Cited:
Please replace "JP 5-191498 A 1/2008" with --JP 5-191496 A 7/1993--.

Signed and Sealed this
Eighteenth Day of February, 2020

Andrei Iancu
*Director of the United States Patent and Trademark Office*